United States Patent [19]

Katoh

[11] Patent Number: 5,450,830
[45] Date of Patent: Sep. 19, 1995

[54] FUEL INJECTION SYSTEM FOR ENGINE
[75] Inventor: Masahiko Katoh, Hamamatsu, Japan
[73] Assignee: Sanshin Kogyo Kabushushiki Kaisha, Hamamatsu, Japan
[21] Appl. No.: 171,914
[22] Filed: Dec. 21, 1993
[30] Foreign Application Priority Data
  Dec. 21, 1992 [JP] Japan .................. 4-356896
[51] Int. Cl.⁶ .................. F02D 7/00; F02M 1/10
[52] U.S. Cl. .................. 123/443; 123/481; 123/59.7; 123/73 A
[58] Field of Search .................. 123/59.7, 73 C, 73 A, 123/443, 481

[56] References Cited

U.S. PATENT DOCUMENTS

| | | | |
|---|---|---|---|
| 4,768,474 | 9/1988 | Fujimoto et al. | 123/481 |
| 4,989,554 | 2/1991 | Kushida et al. | 123/481 |
| 4,991,558 | 2/1991 | Daly et al. | 123/481 |
| 5,007,390 | 4/1991 | Tanaka et al. | 123/443 |
| 5,038,739 | 8/1991 | Ishii | 123/481 |

FOREIGN PATENT DOCUMENTS 63-183236  7/1988  Japan .

Primary Examiner—Willis R. Wolfe
Attorney, Agent, or Firm—Knobbe, Martens, Olson & Bear

[57] ABSTRACT

A fuel injection system for an internal combustion engine is provided wherein fuel supply compensation for low speed, low load or abnormal conditions is variable for a multi-cylinder configuration having one or more cylinders ceased or reduced in operation. Of particular utility in a vertical cylinder bank with compact space for exhaust gas collection and discharge, such as in an outboard motor, said fuel compensation relies upon engine parameters including engine speed and fuel-air ratio to improve engine performance.

17 Claims, 5 Drawing Sheets

FUEL INJECTION SYSTEM FOR ENGINE

BACKGROUND OF THE INVENTION

This invention relates to a fuel injection system for an engine, and more particularly, to an improved charge forming system for an engine having vertically disposed cylinders.

It is well known that the induction and exhaust systems for multiple cylinder engines must be carefully designed so as to prevent adverse affects caused by the action of one cylinder on other and adjacent cylinders. This situation may be best understood by a reference to FIGS. 1 and 2, which show schematically induction and exhaust systems for three cylinder, in-line, two-cycle, crankcase compression internal combustion engines. In each instance, the engine has aligned cylinders A, B and C in which pistons are supported and which drive a crankshaft in a known manner. Each cylinder is provided with a respective induction system D, E and F which in the described constructions are independent from each other and comprises an inlet section in which a throttle valve G is positioned and a discharge section in which a reed-type check valve H is positioned so as to permit flow into the crankcase chambers of the cylinders A, B and C, respectively, but to preclude reverse flow. A suitable charge former is also employed which may supply fuel to the induction systems D, E and F, or which may supply fuel to either the crankcase chambers of the cylinders A, B and C, or incorporate direct injection for injecting the fuel directly into the combustion chambers. Because the induction systems D, E and F are separate from each other, the induction pulses from one cylinder will not be transmitted to or affect those of the other cylinders.

In the exhaust system, indicated by the reference character I in FIG. 1, there is provided a relatively long exhaust pipe J, K and L that extends from the exhaust ports of each cylinder A, B and C to a common atmospheric exhaust discharge M. With this type of arrangement, the exhaust pipes J, K and L can be made long enough so as to avoid any adverse affect from cylinder to cylinder. This is a preferred type of arrangement in most cases.

However, there are certain applications for internal combustion engines which do not permit this type of exhaust system. A specific example of such an application is an outboard motor. As is well known, outboard motors are extremely compact in nature and because of this they must D employ an exhaust system of the general type shown in FIG. 2 and which is indicated by the reference character N. In this exhaust system N, there is a common collector section O which receives exhaust gases from relatively short pipe sections P, Q and R. Also, it should be noted that this type of system generally employs a downwardly depending exhaust pipe S that extends into the drive shaft housing and lower unit for a discharge of the exhaust gases to the atmosphere. As a result of this, each exhaust port is disposed at a different distance from the discharge end and the exhaust pulses from one cylinder can reflect back and cause certain problems, particularly under extremely low speed, low load conditions, that can cause uneven running or other problems.

It has been found that these running problems can be eliminated or substantially reduced if the flow of fuel to the lowermost cylinder C is either discontinued completely or is reduced. Such an arrangement is disclosed in U.S. Pat. No. 5,387,163 That system has proven quite effective in reducing not only exhaust emissions, but improving running characteristics.

It has been found, however, that when the amount of fuel supplied to the lowermost cylinder is either stopped or substantially reduced, then there still may be some instances when running difficulties arise. This is because the engine must still generate the requisite amount of power in order to run smoothly, and it has been found that the effects between the respective exhaust passages can cause the remaining cylinders to run with an improper air-fuel ratio as a result of the exchange of exhaust pulses from one cylinder to the other.

It is, therefore, a principal object of this invention to provide an improved engine fuel supply system and method for operating an engine so as to improve running under low speed, low load conditions.

It is a further object of this invention to provide an improved arrangement for improving the running of an engine having two cylinders, one positioned vertically above the other and wherein either the induction or exhaust system from the cylinders communicate with each other at a relatively close point to the cylinders.

The foregoing discussion has been directed primarily at engines having exhaust systems that interconnect with each other quite close to their cylinders. The same problem, however, can arise when the intake systems communicate with each other close to the cylinders.

Therefore, it is a still further object of this invention to provide an improved method and apparatus for operating a multiple cylinder, vertically extending engine having either induction or exhaust systems which communicate with each other quite close to the cylinders.

SUMMARY OF THE INVENTION

The invention is adapted to be embodied in an internal combustion engine having at least two cylinders, one positioned adjacent the other and which drive a crankshaft. An inlet opening is provided for each cylinder and an induction system supplies at least an air charge to each of the inlet openings. An exhaust outlet is provided for each cylinder and an exhaust system receives the exhaust gases from the exhaust outlets and discharges the exhaust gases to the atmosphere. At least one of the systems has a common portion that is positioned close to the cylinders. Charge forming means are provided for delivering a fuel charge to each of the cylinders.

In accordance with an apparatus for performing the invention, means are responsive to a predetermined condition for supplying a leaner charge to one of the cylinders and a richer charge to the other of the cylinders.

In accordance with a method for practicing the invention, when a predetermined condition is determined, the charge forming means is altered so as to provide a leaner fuel charge to one cylinder and a richer fuel charge to the other cylinder.

DETAILED DESCRIPTION OF THE PREFERRED EMBODIMENT OF THE INVENTION

Figure 1:
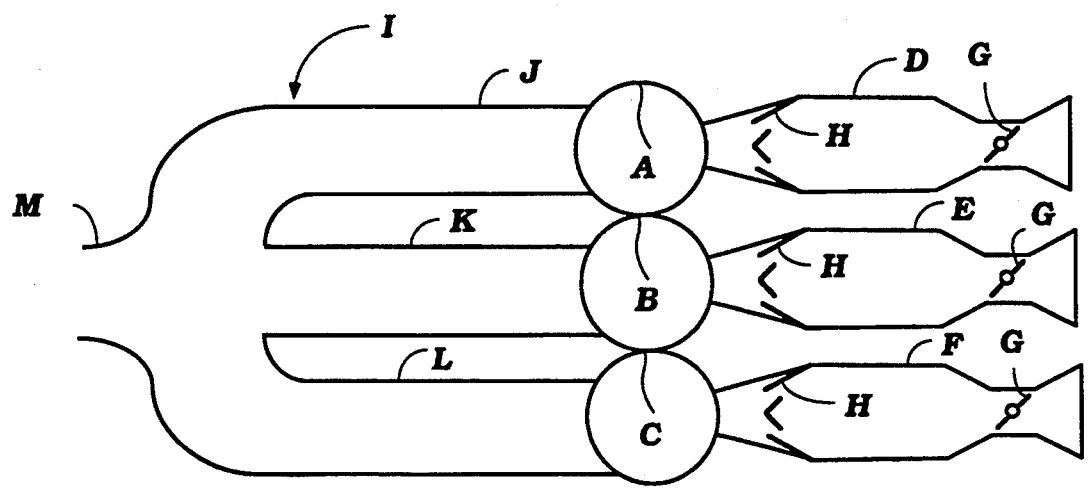
FIG. 1 is a partially schematic view showing an engine having a first type of induction and exhaust system as employed in the prior art.
Figure 2:
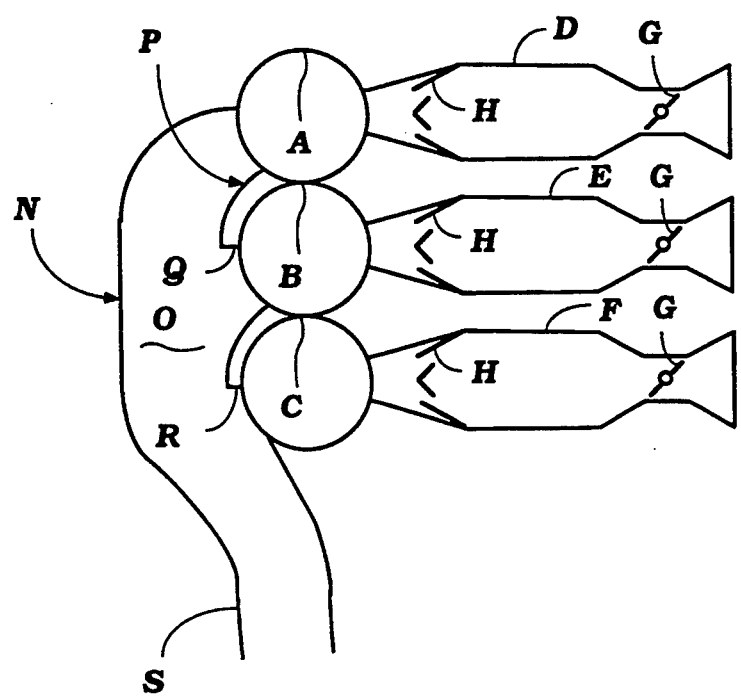
FIG. 2 is a schematic view showing an engine having another type of induction and exhaust system as common in the prior art.
Figure 3:
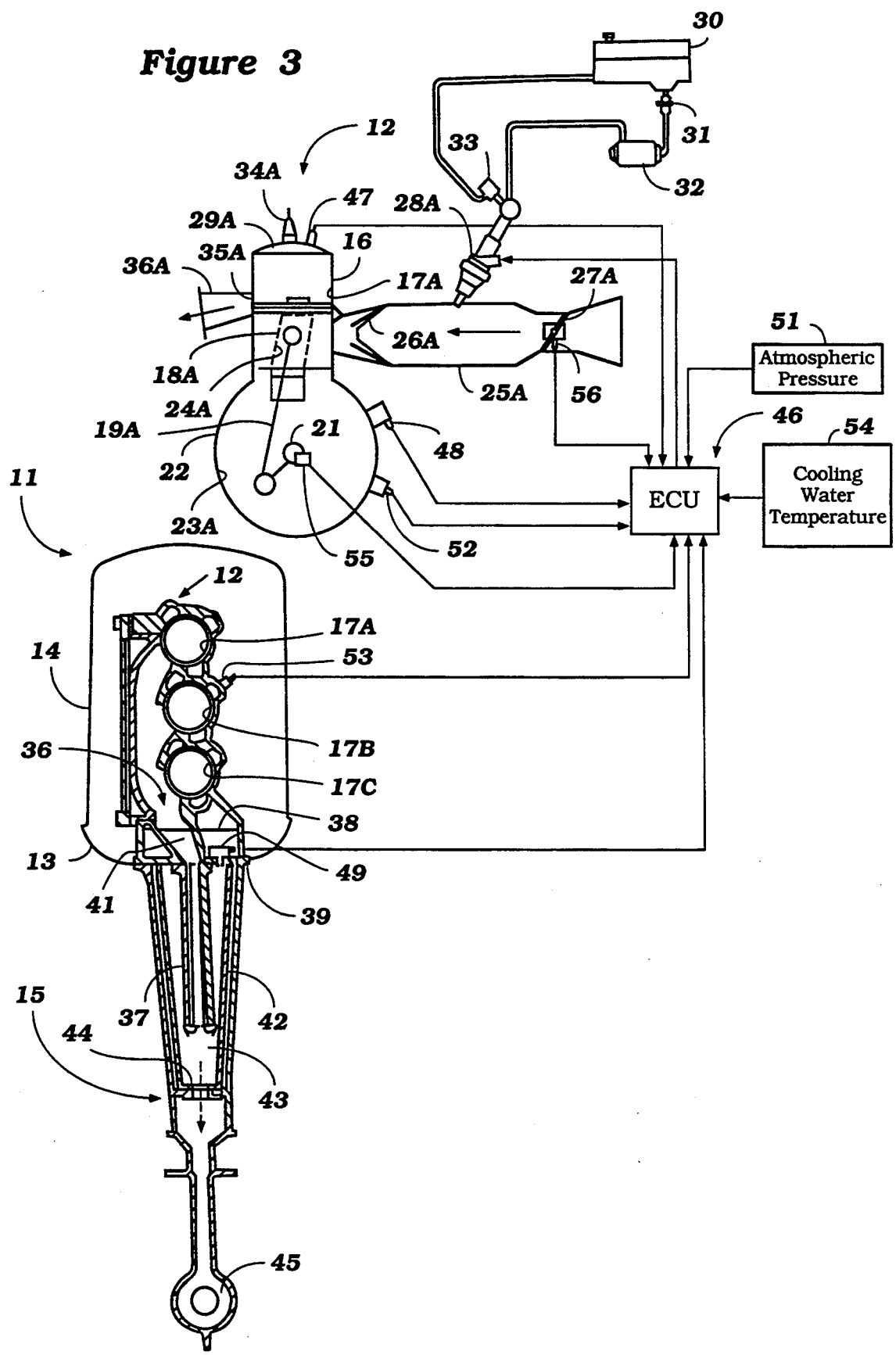
FIG. 3 is a composite and partially schematic elevational view of an outboard motor constructed and operated in accord with an embodiment of the invention, with a portion of the motor broken away to show the engine and exhaust configuration; and a horizontal cross-sectional view for one cylinder of the engine and the engine control unit.

Referring now in detail to FIG. 3, an outboard motor constructed in accordance with a preferred embodiment of the invention is identified generally by reference numeral 11. The invention deals primarily with the powering internal combustion engine of the outboard motor 11 and for that reason the description of the outboard motor 11 will be relatively general and any details of the outboard motor 11 per se which are not described can be considered to be conventional. Although the invention has utility in applications other than outboard motors, it has particular utility in outboard motors due to the fact that the cylinders of outboard motors are positioned vertically one above the other, the output shaft rotates about a vertically extending axis and there is a relatively small area for exhaust gas collection and discharge.

The outboard motor 11 in FIG. 3 is comprised of a power head consisting of an internal combustion engine 12 and a surrounding protective cowling comprised of a lower tray portion 13 and a removable upper main cowling portion 14.

A drive shaft housing and lower unit 15 depends from the tray 13 and the lower unit thereof contains a forward/neutral/reverse transmission driven by the output shaft of the engine 12 in a known manner for driving a propeller (not shown) and selected forward and reverse directions.

In this embodiment of the invention, the engine 12 is comprised of a three-cylinder, in-line arrangement and operates on the two-cycle crankcase compression principal. As will become apparent, the invention can be employed in conjunction with engines having other numbers of cylinders, and in fact, with engines having rotary rather than reciprocating action. However, the invention has particular utility where the chambers of the engine are positioned vertically one above the other.

The engine 12 includes a cylinder block 16 which has a plurality of cylinder bores 17A, 17B and 17C aligned vertically one above the other in a cylinder bank, where cylinder A is uppermost, cylinder B is at middle and cylinder C is lowermost. These cylinder bores 17A, 17B and 17C are formed by liners that are pressed into the cylinder block in a well known manner. Pistons 18A, 18B and 18C are supported for reciprocation in each of the cylinder bores 17A, 17B and 17C. The pistons are connected by means of connecting rods 19 to a crankshaft 21 which is journalled for rotation about a vertically extending axis within a crankcase formed by the skirt of the cylinder block 16 and a crankcase member 22 that is affixed to the cylinder block 16 in a well known manner.

The crankcase member 22 and skirt of the cylinder block 16 form a plurality of respective crankcase chambers, one of which is indicated at 23A, and each of which communicates with a respective one of the cylinder bores 17A, 17B or 17C through respective scavenge passages, only one of which appears in FIG. 3 and is identified by the reference numeral 24A, this being the scavenge passage associated with the cylinder bore 17A. As is well known, the scavenge passages 24 communicate the crankcase chambers 23 with the cylinder bores 17 as the pistons 18 reciprocate.

As aforenoted, the crankshaft 21 of FIG. 3 drives a drive shaft (not shown) that is rotatably journalled within the drive shaft housing 15 and which drives the forward/neutral/reverse transmission in the lower unit. This provides the final drive to the propeller in a manner well known in this art.

A fuel-air charge is delivered to the crankcase chambers 23 from an induction system that includes an induction manifold having individual runners 25A, 25B and 25C which serve respective crankcase chambers 23A, 23B and 23C. Reed-type check valves 26 are disposed in the runners 25 for permitting the fuel-air charge to enter the respective crankcase chambers 23 but for precluding reverse flow when the charge is being compressed due to the downward movement of the respective pistons 18. Respective throttle valves 27 are positioned in the manifold runners 25 for controlling the speed of the engine in a well known manner; the control of the valves 27 may be considered to be conventional and will not further be described. An air intake device including a silencer (not shown) is positioned within the protective cowling 13, 14 for admitting an air charge to the manifold runners 25.

As shown in FIG. 3, fuel injectors 28 are provided in the manifold runners 25 for supplying a fuel charge. It is to be understood that a charge forming system of any type may be employed for supplying such fuel-air charge to the crankcase chambers 23. For a charge forming system of the fuel injection type, the fuel injectors 28 may be provided in either the induction manifold or directly within the cylinder bores 17. The fuel injectors 28 are electrically operated and have solenoids for opening and closing injection valves so as to permit fuel to be sprayed into either the induction manifold runners 25 or a combustion chamber 29A, 29B or 29C formed by each of the cylinder bores 17A, 17B or 17C, pistons 18A, 18B, or 18C and a cylinder head (not shown) affixed to the cylinder bank.

Referring to FIG. 3, fuel is supplied to the fuel injectors 28 from a remotely positioned fuel tank 30 by a conduit system including an in-line filter 31 and a high pressure pump 32. In addition, a fuel pressure regulator 33 is provided for controlling the pressure of the fuel supplied to the individual fuel injectors 28 by bypassing fuel back to the fuel tank 30.

The charge which has thus been formed in the combustion chambers 29 is fired by respective spark plugs 34A, 34B and 34C each mounted in the respective combustion chamber 29A, 29B and 29C and fired by an ignition circuit (not shown). An ignition signal control device of any conventional type and which is well known to those of ordinary skill in the art may be utilized for the firing of said spark plugs 34. Details of the operation of said ignition control device are not necessary to understand the construction and operation of the invention and will not be further described.

When the charge in the individual combustion chambers 29 is fired, it will burn and expand and drive the respective piston 18 downwardly so as to drive the crankshaft 21 in a manner well known. The burnt charge is discharged through a respective exhaust port 35A, 35B or 35C formed in the cylinders 17A, 17B or 17C. The exhaust ports 35 communicate with an exhaust system that includes an exhaust manifold 36 which is formed integrally in the cylinder block 16. The exhaust manifold 36 has individual runner sections 36A, 36B and 36C which communicate with the respective exhaust ports 35A, 35B and 35C and which form respective side by side collector sections into which the runners 36 communicate. The exhaust manifold 36 terminates in an exhaust pipe 37 which depends downwardly into the drive shaft housing 15.

It should be noted that the engine 12 is mounted on a spacer plate 38 mounted on an upper flange 39 of the drive shaft housing 15 and which has a passage 41 for communicating the exhaust manifold 36 with the exhaust pipe 37. The spacer plate 38 is connected to an inner shell 42 which depends into the drive shaft housing 15 and defines an expansion chamber 43 into which the lower end of the exhaust pipe 37 discharges.

The exhaust gases are then discharged from the expansion chamber 43 through a high speed exhaust gas discharge 44 formed at the lower end of the shell 42 and which communicates with the propeller through a hub high speed exhaust gas discharge opening 45. As is well known in this art, an above the water low speed exhaust gas discharge (not shown) is provided for discharging the exhaust gases from the expansion chamber 43 when the associated watercraft is travelling at a low rate of speed and when the propeller discharge 45 is relatively deeply submerged.

As shown in FIG. 3, an engine control unit 46 provides the necessary control for firing of the spark plugs 34 and timing of injection and duration of the fuel injectors 28 in response to varying engine running conditions including low speed, low load and abnormal conditions. The engine control unit 46 utilizes a number of sensors which detect ambient conditions and engine running conditions. Although certain types of sensors will be described herein, it is to be understood that additional inputs of ambient and engine running conditions may be included with or substituted for those which are described. Such variations in the control parameters will be readily apparent to those skilled in the art.

Several pressure detectors are indicated in FIG. 3, including a combustion chamber pressure sensor 47, a crankcase chamber pressure sensor 48 provided in one or more of the crankcase chambers 23A, 23B or 23C, an engine exhaust back pressure sensor 49, and an atmospheric pressure sensor 51. Likewise, several temperature detectors are indicated, including an intake gas temperature sensor 52, an engine temperature sensor 53 mounted in a suitable manner, preferably on the cylinder block 16 in proximity to one of the scavenge passages 18A, and a cooling water temperature sensor 54.

All or some of the aforementioned detectors may be utilized by the engine control unit 46 for various control routines which are not described herein but which are not necessary to understand the construction and operation of the invention. Details of the specific types of sensors to be used for each control parameter will not be discussed but are deemed to be of conventional type well known to those skilled in the art.

In FIG. 3, a sensor 55 is shown for the basic crank angle or revolution number of the crankshaft 21 as is a sensor 56 to detect a throttle valve position $\theta$. These last two detectors in combination with the crankcase chamber pressure sensor 48 are utilized in a control routine to be described whereby normal fuel injection duration and compensations for fuel injection duration under low speed, low load conditions are provided. It may be noted that the crankcase pressure is known to those skilled in the art to be an accurate detector of air supply for purposes of determining air-fuel ratio.

It is well known that the described engine construction, with aforenoted side by side exhaust collector sections of relatively short lengths, when under a low speed, low load condition gives rise to poor performance for the reasons as aforenoted in co-pending application Ser. No. 08/067,220. Also, as described in that application, the disclosure of which is incorporated herein by reference, improved running can be achieved by substantially reducing or stopping the flow of fuel to the lowermost (C) cylinder. However, as aforenoted, further improvements in running can be enjoyed if, at the time the supply of fuel to the lowermost cylinder (C) is stopped or reduced, if the fuel supply to the remaining cylinders (A and B) is increased. A fuel injection control system, now to be described, for the three-cylinder embodiment compensates the top two (A, B) cylinders' fuel supply upon the cessation of the third or bottom (C) cylinder such that an improvement in engine performance is achieved under the low speed, low load condition.

Figure 4:
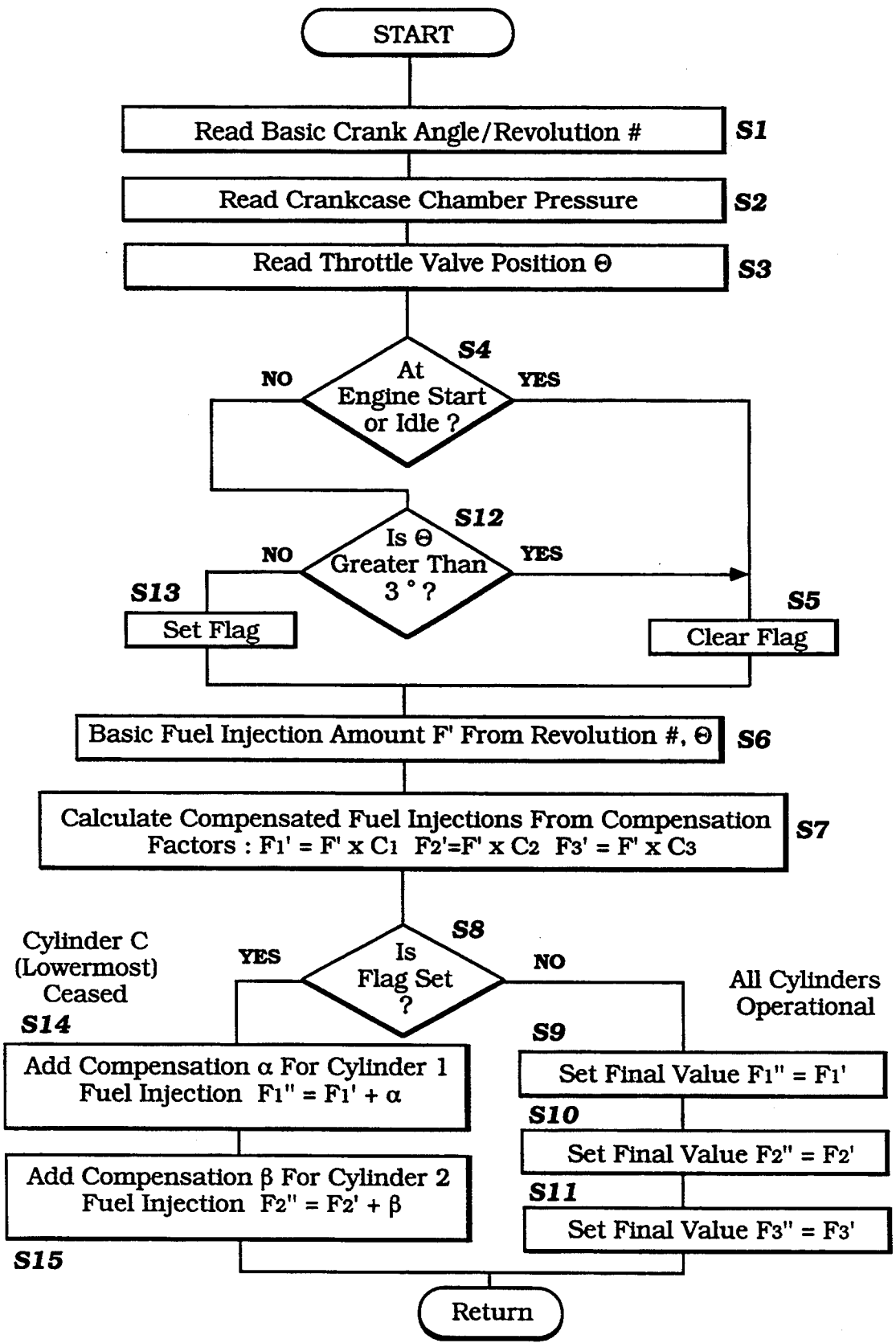
FIG. 4 is a block diagram for the control routine.

Referring now in detail to FIG. 4, a control routine for the fuel injection duration begins at step S1 with a reading by the engine control unit 46 of the number of revolutions from the crank angle sensor 55, a reading of the crankcase chamber pressure sensor 48 at step S2, and a reading of the throttle valve position $\theta$ from the throttle position sensor 56 at step S3. Once these values are known, a determination is made at step S4 as to whether the engine is first starting, starting to idle. If either situation is true it is not desirable to initiate the control routine practicing the invention until idle has stabilized.

Therefore, at the engine start or start of idling, a flag to indicate low speed, low load fuel injection compensation is cleared to a value '0' at step S5, and a basic fuel injection amount F' is determined from the number of revolutions read from the crank angle sensor 55 and the sensed throttle position $\theta$ as indicated in step S6. The basic fuel injection amount F' may be read by the control routine from a map or memory (not shown) in the engine control unit 46.

Any compensation factors from engine control routines not described herein but which are well known to those skilled in the art are then applied to the basic injection amount F' at step S7 to calculate a fuel injection amount for each cylinder F'$_1$, F'$_2$ and F'$_3$, where said amounts correspond to cylinders A, B and C, respectively. Next, the status of the flag is read at step S8 and if it is not set to a value of '1', then the final fuel injection amounts for the cylinders are output to the fuel injection system without further modification as F''$_1$, F''$_2$ and F''$_3$ and as shown at the bottom right of FIG. 4 as steps S9 through S11.

If idle has stabilized or the engine is not at idle and not first being started at step S4, a further determination is made as to the degree of opening of the throttle valve at step S12. That is, it is determined whether the sensed value $\theta$ is greater than 3 degrees. If $\theta$ is greater than 3 degrees, then the flag is cleared to a value '0' at step S5 and the routine proceeds as previously described from the determination of the basic fuel injection amount F' at step S6 to step S11.

If the value of $\theta$ is less than or equal to 3 degrees, indicating a low speed, low load condition, then the flag is set to a value '1' at step S13 and the routine proceeds to calculate the basic fuel injection amount F' at step S6 and any other control routine compensations to determine $F'_1$, $F'_2$ and $F'_3$ at step S7. Next, upon a determination of a flag value '1' at step S8, fuel injection duration compensations of the invention are added to obtain the final cylinder A and B amounts $F''_1$ and $F''_2$ at steps S14 and S15 while cylinder C is ceased in operation and therefore receives no fuel injection amount. Steps S1 through S11 or S15 are repeated throughout the engine operation.

Figure 5:
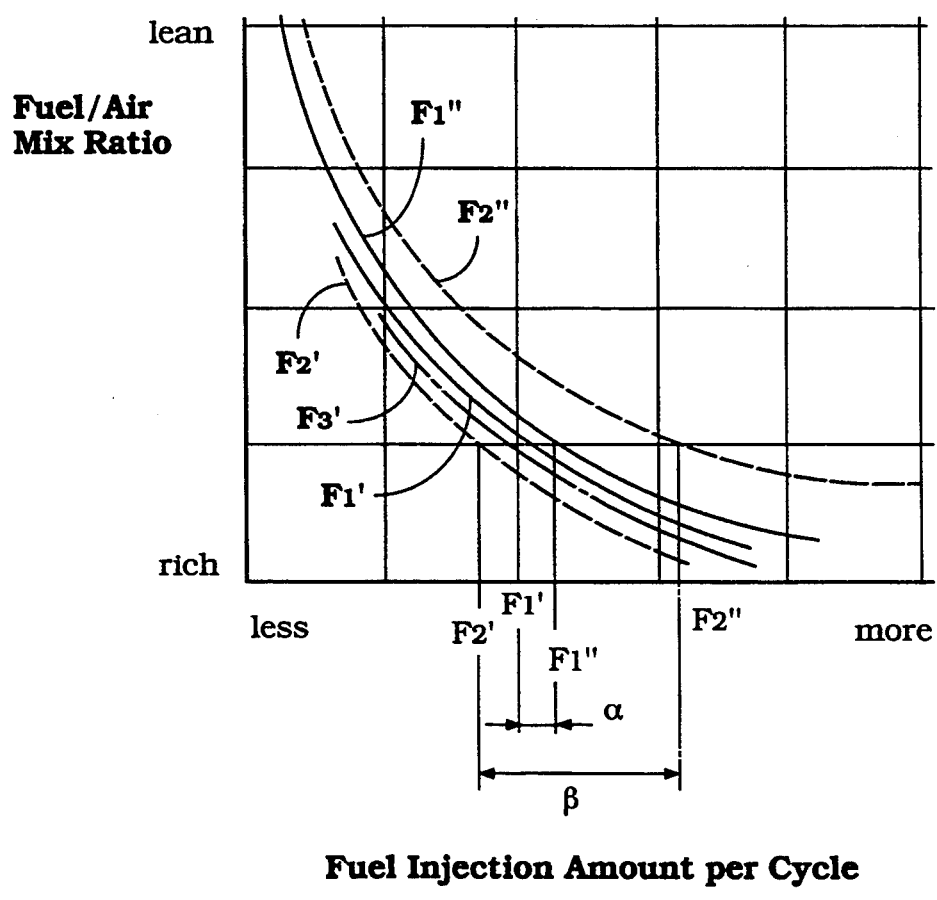
FIG. 5 is a representation of the fuel-air mix ratio and the fuel injection duration during normal running of all cylinders and at the cessation of operation of cylinder C (lowermost cylinder)

FIGS. 4 and 5 show addition of values $\alpha$ and $\beta$ to cylinders A and B fuel injection duration values, respectively, wherein cylinder C is ceased at the low speed, low load condition. Such values $\alpha$ and $\beta$ are unequal due to resultant load differences on the upper and middle cylinders A and B, respectively, upon cessation of the lower cylinder C and due to unequal effects on the remaining operative cylinders A and B by a change in exhaust gas pulsation. FIG. 5 further illustrates that the values $\alpha$ and $\beta$ will vary according to a fuel-air ratio under control of the engine control unit 46. As aforementioned, description of the specific fuel-air ratio control routine is not necessary to understand the construction and operation of the invention and may be of any known type.

Figure 6:
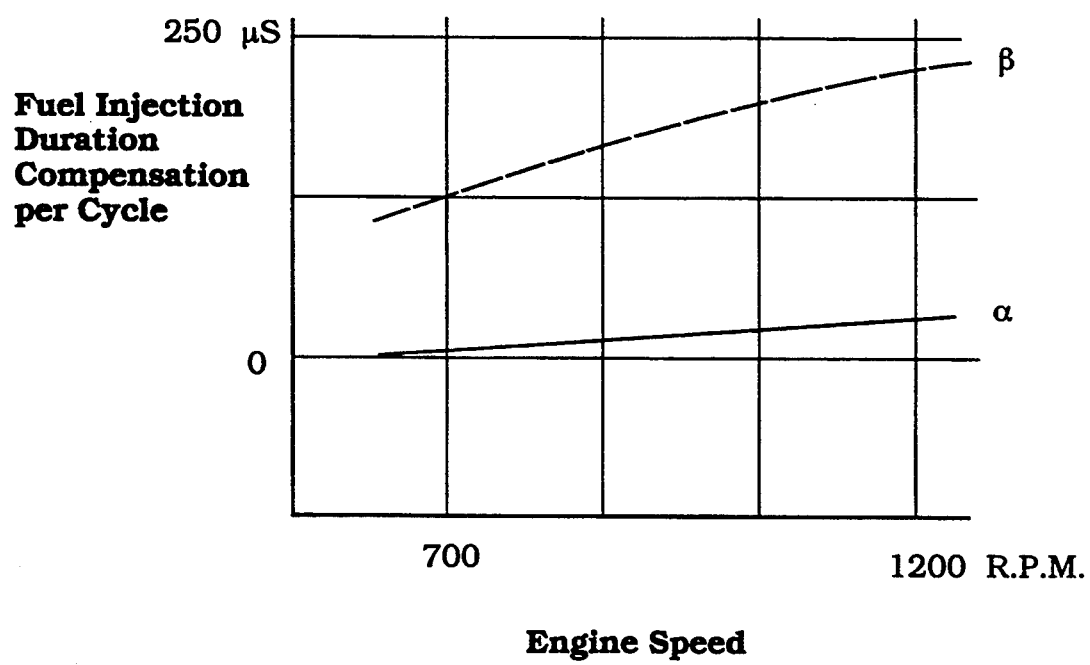
FIG. 6 is a representation of the fuel injection duration compensations for cylinders A and B at various engine speeds at the cessation of operation of cylinder C.

Referring in addition to FIG. 6, $\alpha$ and $\beta$ are also variable with respect to engine speed, where an engine speed sensor (not shown) provides such information to the engine control unit 46 and a relationship to compensations $\alpha$ and $\beta$ may be stored in a map (not shown). Said engine speed sensor may be considered conventional and well known to those skilled in the art. Thus, the fuel injection compensation of the invention in this embodiment provides for both fuel-air ratio and engine speed parameters to improve engine performance under low speed, low load conditions.

It should be noted that while detailed description has been given to a three-cylinder configuration having exhaust systems connecting close to the cylinders, the invention has utility in any multi-cylinder embodiment having either induction or exhaust systems communicating close to the cylinders. Also, although cessation of the lowermost cylinder is described herein, ceasing or reducing operation of one or more of any of the cylinders may be proscribed and compensations provided for by the invention. The compensations $\alpha$, $\beta$ etc. may similarly vary from those described with respect to their relative magnitudes, the cylinders represented and the dependent engine parameters to provide for any abnormal condition as well as a low speed, low load condition.

Thus, it is to be understood that the described construction is of a preferred embodiment of the invention and various other changes and modifications may be made without departure from the spirit and scope of the invention, as defined by the appended claims.

I claim:

1. An internal combustion engine having at least two cylinders positioned adjacent the other and containing pistons driving a crankshaft, an inlet opening for each cylinder, an induction system for supplying at least an air charge to each of said inlet openings, an exhaust outlet for each cylinder, an exhaust system for receiving the exhaust gases from said exhaust outlets and discharging the exhaust gases to the atmosphere, at least one of said systems having a common portion close to said cylinders so that the condition in one of said cylinders will effect the condition in the other of said cylinders, charge forming means for delivering a fuel charge to each of said cylinders, means for sensing engine conditions for controlling the amount of fuel supplied by said charge forming means to said cylinders, and means responsive to a predetermined condition for both reducing the fuel charge supplied to one of the cylinders and increasing the fuel charge supplied to another cylinder during the same cycle.

2. An internal combustion engine as set forth in claim 1, wherein the cylinders are positioned one vertically above the other and wherein the crankshaft rotates about a vertically extending axis, the exhaust system discharging exhaust gases downwardly to a position below the cylinders.

3. An internal combustion engine as set forth in claim 2, wherein the engine operates on a two-cycle crankcase compression principal.

4. An internal combustion engine as set forth in claim 3, wherein the charge forming means comprises a fuel injector for each cylinder.

5. An internal combustion engine as set forth in claim 1, wherein the predetermined condition is a low engine speed.

6. An internal combustion engine as set forth in claim 1, wherein the fuel charge supplied to the one cylinder is completely discontinued when the fuel charge to the other cylinder is increased.

7. An internal combustion engine as set forth in claim 6, wherein the cylinders are positioned one vertically above the other and wherein the crankshaft rotates about a vertically extending axis, the exhaust system discharging exhaust gases downwardly to a position below the cylinders.

8. An internal combustion engine as set forth in claim 7, wherein the one cylinder is the lowest cylinder.

9. An internal combustion engine as set forth in claim 8, wherein the engine operates on a two-cycle crankcase compression principal.

10. An internal combustion engine as set forth in claim 9, wherein the charge forming means comprises a fuel injector for each cylinder.

11. An internal combustion engine as set forth in claim 2, wherein there are at least three cylinders one positioned vertically above the other.

12. An internal combustion engine as set forth in claim 2, wherein the engine is provided in conjunction with an outboard motor and the engine is positioned in the power head of the outboard motor and the engine output shaft drives a drive shaft passing through a drive shaft housing positioned beneath the power head, and including an expansion chamber into which the exhaust outlet discharges.

13. An internal combustion engine as set forth in claim 12, further including an expansion chamber in the drive shaft housing into which the exhaust outlet discharges.

14. A method of operating an internal combustion engine having at least two cylinders positioned adjacent each other and containing pistons driving a crankshaft, an inlet opening for each cylinder, an inlet system for supplying at least an air charge to each inlet opening, an exhaust outlet for each cylinder, an exhaust system for receiving the exhaust gases from said exhaust outlets and discharging the exhaust gases to the atmosphere, one of said systems having a common portion disposed in close proximity to the cylinders so that the condition in one of the cylinders will have an effect on the other of the cylinders, charge forming means for delivering a fuel charge to each of said cylinders, said method comprising the steps of monitoring engine condition and controlling the amount of fuel supplied by the charge forming means to the cylinders in response to the engine condition, sensing a predetermined condition and both reducing the fuel charge supplied to one of the cylinders and increasing the fuel charge supplied to another cylinder during the same cycle and when the predetermined condition is sensed.

15. An internal combustion engine as set forth in claim 14, wherein the cylinders are positioned one above the other and the crankshaft rotates about a vertically extending axis.

16. An internal combustion engine as set forth in claim 15, wherein the one cylinder is the lowermost cylinder.

17. An internal combustion engine as set forth in claim 16, wherein the supply of fuel to the lowermost cylinder is discontinued.

* * * * *